(12) United States Patent  
Choudhury

(10) Patent No.: US 8,327,256 B2
(45) Date of Patent: Dec. 4, 2012

(54) MATRIX TREE PRESENTATION STRUCTURES

(75) Inventor: Akhil Choudhury, Livermore, CA (US)

(73) Assignee: Oracle International Corporation, Redwood Shores, CA (US)

(*) Notice: Subject to any disclaimer, the term of this patent is extended or adjusted under 35 U.S.C. 154(b) by 772 days.

(21) Appl. No.: 12/274,172

(22) Filed: Nov. 19, 2008

(65) Prior Publication Data

US 2010/0125779 A1    May 20, 2010

(51) Int. Cl.
G06F 17/24    (2006.01)
(52) U.S. Cl. .................. 715/214; 715/215; 715/227
(58) Field of Classification Search .............. 715/201, 715/215, 227, 214; 707/798
See application file for complete search history.

(56) References Cited

U.S. PATENT DOCUMENTS

| | | | |
|---|---|---|---|
| 5,257,365 A | 10/1993 | Powers et al. | |
| 5,604,854 A * | 2/1997 | Glassey | 715/209 |
| 5,621,905 A | 4/1997 | Jewson et al. | |
| 5,724,577 A | 3/1998 | Exley et al. | |
| 5,917,492 A | 6/1999 | Bereiter et al. | |
| 6,038,573 A | 3/2000 | Parks | |
| 6,205,453 B1 | 3/2001 | Tucker et al. | |
| 6,226,647 B1 * | 5/2001 | Venkatasubramanian et al. | 1/1 |
| 6,317,750 B1 | 11/2001 | Tortolani et al. | |
| 6,442,575 B2 | 8/2002 | Pratley et al. | |
| 6,851,089 B1 | 2/2005 | Erickson et al. | |
| 6,877,009 B2 | 4/2005 | Solomon | |
| 7,076,502 B2 * | 7/2006 | Shoup et al. | 1/1 |
| 7,143,339 B2 * | 11/2006 | Weinberg et al. | 715/212 |
| 7,155,667 B1 | 12/2006 | Kotler et al. | |
| 7,350,141 B2 | 3/2008 | Kotler et al. | |
| 7,412,645 B2 | 8/2008 | Kotler et al. | |
| 7,451,154 B2 | 11/2008 | Solomon | |
| 7,774,303 B2 * | 8/2010 | Shoup et al. | 707/604 |
| 2002/0087516 A1 | 7/2002 | Cras et al. | |
| 2002/0091681 A1 | 7/2002 | Cras et al. | |
| 2004/0034615 A1 | 2/2004 | Thomson et al. | |
| 2004/0153435 A1 | 8/2004 | Gudbjartsson et al. | |
| 2004/0205536 A1 | 10/2004 | Newman et al. | |
| 2004/0243616 A1 * | 12/2004 | Benhase et al. | 707/102 |
| 2005/0010566 A1 | 1/2005 | Cushing et al. | |
| 2005/0038768 A1 | 2/2005 | Morris | |

(Continued)

OTHER PUBLICATIONS

U.S. Appl. No. 12/274,212, pp. 52.

(Continued)

Primary Examiner — Doug Hutton, Jr.
Assistant Examiner — Brian Garmon
(74) Attorney, Agent, or Firm — Silicon Valley Patent Group LLP; Omkar Suryadevara

(57) ABSTRACT

Approaches for rendering data on a display are provided using matrix tree and matrix tree table presentation structures. A matrix table is rendered on a display. The matrix table comprises a set of columns and a set of rows. Each column is associated with a different dimension instance of a first dimension, and each row is associated with a different dimension instance of a second dimension. The intersection of each column and row is a cell. In one approach, a tree of nodes is rendered within at least one cell of the matrix table. In another approach, a tree table is rendered within at least one cell of the matrix table. The tree table comprises a tree of nodes, where each node of the tree of nodes comprises a row of data. A tree of nodes in a cell of the matrix table may be expanded or collapsed upon request.

19 Claims, 11 Drawing Sheets

U.S. PATENT DOCUMENTS

2005/0055437 A1* 3/2005 Burckart et al. ............. 709/224
2008/0155479 A1 6/2008 Long et al.
2009/0319543 A1* 12/2009 Danton et al. ............. 707/100

OTHER PUBLICATIONS

Scand LLC, "The Java Boutique: Tree Table—Tree structure is very popular. Here . . . ", pp. 2, Oct. 25, 2000, <URL: http://javaboutique.internet.com/TreeTable>.

David Mertz, "XML Matters #22: Roundup of XML Editors," pp. 6, Aug. 2002, <URL: http://gnosis.cx/publish/programming/xml-editors-2.html>.

Jenifer Tidwell, "Tree-table" in the book "Designing Interfaces" O'Reilly Media, pp. 2, Nov. 28, 2005, <URL: http://designinginterfaces.com/Tree-Table>.

Scand LLC, "Tree Table 2.01", pp. 2, Nov. 23, 2004, <URL: http://treetable.scand.qarchive.org/>.

U.S. Appl. No. 12/274,212, Office Action, Aug. 31, 2011, pp. 21.
U.S. Appl. No. 12/274,212, Amendment, Nov. 20, 2011, pp. 11.
U.S. Appl. No. 12/274,212, Amendment, Nov. 30, 2011, pp. 11.
U.S. Appl. No. 12/274,212, Final Office Action, Mar. 15, 2012, pp. 25.
U.S. Appl. No. 12/274,212, Applicant's Initiated Interview Summary, Jun. 11, 2012, pp. 3.
U.S. Appl. No. 12/274,212, Amendment, Jun. 15, 2012, pp. 11.

* cited by examiner

| Pool | Unit | Total Eligible Employees | Total Eligible Salary | Overall Budget | | Budget Distribution | | Total Target | | Emplo Alloca Used |
|---|---|---|---|---|---|---|---|---|---|---|
| | | | | Amount | Percent | Distributed | Available | Amount | Percent | |
| Salary | USD | 19 | 2,183,700.00 | 251,125.00 | 11.5 | | 251,125.00 | 251,125.00 | 10 | 90,000.00 |

400

| Manager | Access | Employee List | Total Eligible Employees | Total Eligible Salary |
|---|---|---|---|---|
| ⊟─📁 Me | View Access | 📄 | 4 | 543,900.00 |
| ⊟─📁 Blair Palmer | Full Access | 📄 | 2 | 200,000.00 |
| └─📄 Elizabeth Nair | Full Access | 📄 | 1 | 120,000.00 |
| ⊟─📁 Janice Hoffman | Full Access | 📄 | 2 | 195,000.00 |
| └─📄 Lee Haney | No Access | 📄 | 1 | 90,700.00 |
| └─📄 Robert Hogan | View Access | 📄 | 1 | 110,400.00 |
| ⊟─📁 Toby McGuire | View Access | 📄 | 7 | 811,900.00 |
| └─📄 Greg Sandford | Full Access | 📄 | 1 | 111,800.00 |
| Total | | | 19 | 2,183,700.00 |

FIG. 5 (PRIOR ART)

JOB DIMENSION 610

|  | ANALYST | CLERK | MANAGER | PRESIDENT | SALESMAN |  |
|---|---|---|---|---|---|---|
| 10 | $0.00 | $1300.00 | $2450.00 | $5000.00 | $0.00 | $8750.00 |
| 20 | $6000.00 | $1900.00 | $2975.00 | $0.00 | $0.00 | $10875.00 |
| 30 | $0.00 | $950.00 | $2850.00 | $0.00 | $5600.00 | $9400.00 |
|  | $6000.00 | $4150.00 | $8275.00 | $5000.00 | $5600.00 | $29025.00 |

DEPARTMENT DIMENSION 620

FIG. 6 (PRIOR ART)

NESTED DIMENSION TREE PRESENTATION STRUCTURE WITH THREE DIMENSIONS

990 — Country
992 — Region
994 — Department

United States
  Western
    10
      Manager Name
      − Barry
        + Al
        + Sam
    20
      + Sanej
    30
      + Greg
  Eastern
    10 + Larry
    20 + Badan
    30 + Neel
England
  Western
    10 + Bruce 30 − Lawrence
      + Roland
      + Derek       *980*

NESTED DIMENSION TREE TABLE PRESENTATION STRUCTURE WITH TWO DIMENSIONS

Region — 1010
  Deptno — 1012

Western — 1020
 10 — 1030

| Employee Name | Hiredate | Salary |
|---|---|---|
| −Barry | 01/01/1990 | 10000 |
| Al | 01/07/1992 | 7000 |
| Sam | 01/09/1998 | 5000 |

1040

1032
  20 — 1060   1050

1034

| +Sanej | 08/09/1997 | 7000 |
|---|---|---|

30

| +Greg | 07/09/1977 | 7000 |
|---|---|---|

1022

Eastern

| 10 +Larry | 01/01/1990 | 12000 |
|---|---|---|
| 20 +Badan | 08/09/2003 | 13000 |
| 30 +Neel | 02/01/1997 | 6000 |

1030
1032
1034 — Northern
1024

NESTED DIMENSION TREE TABLE PRESENTATION STRUCTURE WITH THREE DIMENSIONS

<u>Country</u> ⁓ 1090
  <u>Region</u> ⁓ 1092
    <u>Deptno</u> ⁓ 1094

United States

Western

10

| Employee Name | Hiredate | Salary |
|---|---|---|
| −Barry | 01/01/1990 | 10000 |
| Al | 01/07/1992 | 7000 |
| Sam | 01/09/1998 | 5000 |

20

| | | |
|---|---|---|
| +Sanej | 08/09/1997 | 7000 |

30

| | | |
|---|---|---|
| +Greg | 07/09/1977 | 7000 |

Eastern

| | | | |
|---|---|---|---|
| 10 | +Larry | 01/01/1990 | 12000 |
| 20 | +Badan | 08/09/2003 | 13000 |
| 30 | +Neel | 02/01/1997 | 6000 |

England

Western

10

| | | |
|---|---|---|
| +Bruce | 03/09/2002 | 8000 |

30

| | | |
|---|---|---|
| −Lawrence | | |
| + Rowland | 05/11/1998 | 7000 |
| + Derek | 08/13/1997 | 9000 |

MATRIX TREE PRESENTATION STRUCTURES

RELATED APPLICATION DATA

This application is related to U.S. patent application Ser. No. 12/274,212, entitled "Nested Dimensions Presentation Structures," filed concurrently herewith, invented by Akhil Choudhury, the contents of which are herein incorporated by reference for all purposes as if fully set forth herein.

FIELD OF THE INVENTION

Embodiments of the present invention relate to rendering data on a display.

BACKGROUND OF THE INVENTION

There are many contexts in which a computerized entity may need to retrieve, arrange, and display data to a user in a manner that facilities understanding of the data. For example, computerized entities are often responsible for constructing web pages or other visual presentations that are rendered on a display device. Such web pages and visual presentations often employ a presentation structure that organizes the data and depicts relationships lying therein. A presentation structure, as used herein, is a structured format for depicting data on a display.

One such presentation structure is a tree. A tree is an acyclic connected graph where each node has a set of zero or more child nodes and at most one parent node. A tree may be helpful for organizing or classifying data as every node in the tree can be traced to a single origin through a unique path.

According to one approach for using a tree, data is initially retrieved from a database by an application server that issues a database command (a "select statement") to a database server. The database server processes the database command, retrieves the data from the database, and provides the data to the application server. The application server then assembles the data in a tree structure that forms part of a web page. The application server sends the web page to a web server. The web server sends the web page to a web browser, which in turn renders the web page on a display. The viewer of the web page can more readily digest the organization and structure of the data by its depiction in the tree.

A problem with trees is that they do not allow the data stored therein to be easily analyzed across multiple dimensions. To illustrate, assume a particular tree stores employee data in each node of the tree. If a user wishes to view employee data for a desired region, then employee data for the desired region will need to be retrieved so the tree may be populated with the appropriate data. The employee data for the desired region can be obtained by issuing a select statement, to the database server, that identifies the desired region as a filter value in a "where clause." Thereafter, if the user wishes to view employee data for new region, then another select statement with a filter value identifying the new region will need to be executed, and the tree once again will need to be populated with the newly retrieved data. Executing multiple database commands in this manner is not desirable, as it increases the computational resources as well as the time and effort involved in viewing the necessary data.

The other presentation structures that are currently available, such as a table, also have disadvantages which limit their usefulness for analyzing data across multiple dimensions. Therefore, improved approaches for presenting data to a user would be desirable. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF THE INVENTION

Improved techniques are provided for rendering data on a display. Embodiments of the invention advantageously depict data using a new presentation structure that presents hierarchical data and relational data in a unified manner. Advantageously, embodiments of the invention enable a user to view data from perspectives not previously possible without repopulating the presentation structure used to display the data.

In an embodiment, a presentation manager retrieves data from a storage medium. The presentation manager instructs a display manager to render a visual presentation depicting the retrieved data on a display device. The visual presentation includes a matrix table. The matrix table comprises a set of columns and a set of rows. Each column is associated with a different dimension instance of a first dimension, and each row is associated with a different dimension instance of a second dimension. The intersection of each column and row of the matrix table is referred to as a cell.

In one approach, a tree of nodes is rendered within at least one cell of the matrix table. In another approach, a tree table is rendered within at least one cell of the matrix table. A tree table comprises a tree of nodes, where each node of the tree of nodes comprises a row of data. A tree of nodes in a cell of the matrix table may be expanded or collapsed upon request.

Advantageously, embodiments of the invention may (a) render hierarchical data in a tree table or tree of each node of a matrix table while (b) rendering relational data in the rows and columns of the matrix table. Embodiments of the invention enable one to view multiple sets of hierarchical data simultaneously, thereby saving time and computational resources. In addition, one can ascertain an understanding of data presented by embodiments of the invention with less effort than prior approaches as relationships lying within the data are visually depicted with greater clarity.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 5 is an illustration of a tree table according to the prior art;

FIG. 6 is an illustration of a matrix table according to the prior art;

FIG. 10A is an illustration of a first nested dimension tree table presentation structure according to an embodiment of the invention;

FIG. 10B is an illustration of a second nested dimension tree table presentation structure according to an embodiment of the invention.

DETAILED DESCRIPTION OF THE INVENTION

Approaches for rendering data on a display are described. In the following description, for the purposes of explanation, numerous specific details are set forth in order to provide a thorough understanding of the embodiments of the invention discussed herein. It will be apparent, however, that the embodiments of the invention discussed herein may be practiced without these specific details. In other instances, well-known structures and devices are shown in block diagram form in order to avoid unnecessarily obscuring the embodiments of the invention discussed herein.

Architecture Overview

Figure 1:
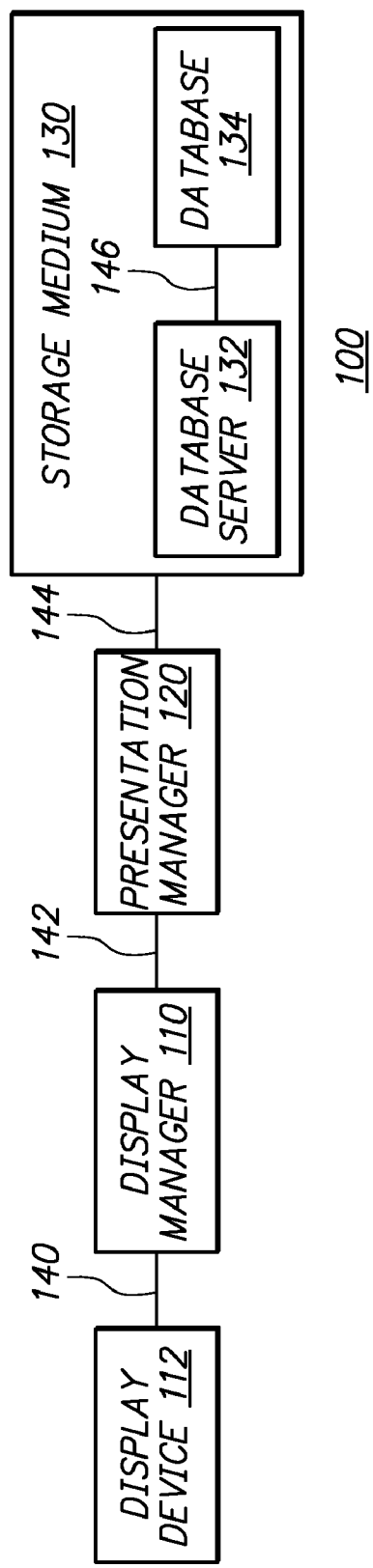
FIG. 1 is a block diagram of an illustrative system according to an embodiment of the invention.

FIG. 1 is a block diagram of an illustrative system 100 according to an embodiment of the invention. System 100 may be used to render data on a display according to embodiments of the invention. In an embodiment, system 100 comprises display manager 110, display device 112, presentation manager 120, storage medium 130, and communications links 140, 142, and 144.

Display manager 110 represents any mechanism capable of causing digital data to be rendered on display device 112. Non-limiting, illustrative examples of display manager 110 include a web browser and a software application. In an embodiment, display manager 110 receives instructions from presentation manager 120 to render data on display device 112.

Display device 112 represents any physical mechanism capable of displaying rendered digital data. Non-limiting, illustrative examples of display device 112 include a computer monitor, a television set, and a physical display window of a wireless device.

Note that while only one display manager 110 and one display device 112 are depicted in FIG. 1, embodiments of the invention may include any number of display managers and any number of display devices. In some embodiments (not depicted in FIG. 1), display manager 110 may cause digital data to be rendered on multiple display devices 112. In other embodiments (not depicted in FIG. 1) presentation manager 120 may instruct multiple display managers 110 to render data on a display device 112.

Figure 2:
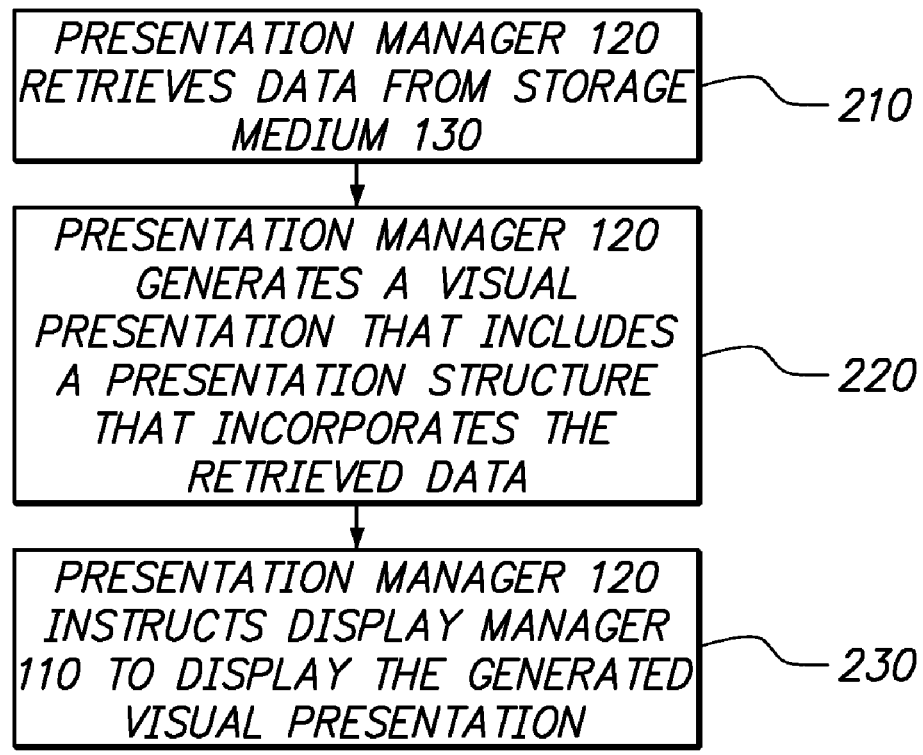
FIG. 2 is a flowchart depicting actions performed by presentation manager according to an embodiment of the invention.

In an embodiment, presentation manager 120 represents any computerized entity, such as one or more software components, capable of performing the steps of FIG. 2. FIG. 2 is a flowchart depicting actions performed by presentation manager 120 according to an embodiment of the invention. As shown in FIG. 2, in step 210, presentation manager 120 retrieves data from storage medium 130. The user may identify the data that presentation manager 120 is to retrieve in step 210. For example, the user may submit, to presentation manager 120, a request for a particular web page or other visual presentation that includes a presentation structure according to an embodiment of the invention. The request may also identify a data set to display within the presentation structure.

In step 220, presentation manager 120 generates a visual presentation that includes a presentation structure incorporating, at least of portion of, the retrieved data. Non-limiting, illustrative examples of a visual presentation generated by presentation manager 120 include a web page, an electronic document, and a digital image. In step 230, presentation manager 120 instructs display manger 110 to display the generated visual presentation on display device 112.

While presentation manager 120 is depicted in FIG. 1 as a single entity, in some embodiments, presentation manager 120 may be implemented as two or more entities. For example, in an embodiment, presentation manager 120 may be implemented using a web server and an application server. In certain embodiments of the invention, presentation manager 120 may be implemented using Oracle Fusion Middleware family of products, available from Oracle Corporation of Redwood Shores, Calif.

In some embodiments (not depicted in FIG. 1), display manager 110 and presentation manager 120 may be implemented as a single entity. To illustrate such an embodiment, display manager 110 and presentation manager 120 may be implemented as a single entity (denoted the "combined display and presentation manager") executing on the same machine, such as a hand held wireless device or personal computer. The combined display and presentation manager may retrieve data (either stored locally or from a remote location), generate a visual presentation, and display the generated visual presentation on display device 112.

Storage medium 130 represents any medium for storing, either persistently or non-persistently, digital data. Non-limiting, illustrative examples of storage medium 130 include a file server and a database management system (DBMS). In the embodiment depicted in FIG. 1, storage medium 130 is implemented using a DBMS comprising a database server 132 and a database 134. In an embodiment, the data stored in storage medium 130 may represent any number of physical and tangible objects, e.g., data stored in storage medium 130 may represent data about an organization, a business, or data about any real-world activity.

Communications link 140 may be implemented by any medium or mechanism that provides for the exchange of data between display device 112 and display manger 110. Communications link 142 may be implemented by any medium or mechanism that provides for the exchange of data between display manager 110 and presentation manager 120. Communications link 144 may be implemented by any medium or mechanism that provides for the exchange of data between presentation manager 120 and storage medium 130. Communications link 146 may be implemented by any medium or mechanism that provides for the exchange of data between database server 132 and database 134. Non-limiting, illustrative examples of communications links 140, 142, 144, and 146 include, without limitation, a network such as a Local Area Network (LAN), Wide Area Network (WAN), Ethernet or the Internet, one or more terrestrial, satellite or wireless links, and serial or parallel printer cables.

FIG. 1 is not intended to depict all embodiments of the invention, as some embodiments of the invention may differ in their implementation than system 100 depicted in FIG. 1. Having explained an illustrative system 100 according to an embodiment of the invention, several illustrative presentation structures will now be discussed to promote a better understanding of embodiments of the invention.

Trees

To facilitate understanding of the embodiments of the invention that will be discussed starting with the section entitled "Matrix Tree Table Presentation Structure," it will be helpful to review other presentation structures. A presentation structure is a structured format for depicting data on a display.

Figures 3, 4:
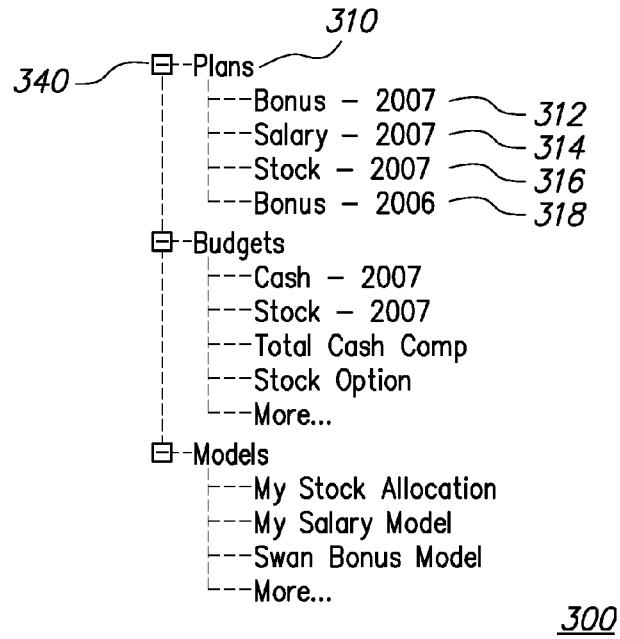
FIG. 3 is an illustration of a tree according to the prior art.
FIG. 4 is an illustration of a table according to the prior art.

An exemplary presentation structure is a tree. FIG. 3 is an illustration of tree 300 according to the prior art. Tree 300 may be incorporated as part of a visual presentation generated by presentation manager 120 and shown on display device 112. Tree 300 is an acyclic connected graph where each node of tree 300 has a set of zero or more child nodes, and at most one parent node.

Hierarchical data is depicted in the nodes of tree 300. Hierarchical data is data that is organized in a hierarchical structure using parent/child relationships, where each parent can have many children but each child has, at most, one parent. For example, (a) hierarchical data is stored in nodes 310, 312, 314, 316, and 318, and (b) nodes 312, 314, 316, and 318 are child nodes of node 310.

As every node can be traced to a single origin through a unique path, trees may be helpful for organizing or classifying data. To illustrate, it is readily apparent by looking at tree 300 that the data stored in nodes 312, 314, 316, and 318 has a child relationship to the data stored in node 310.

The visual display of tree 300 may be dynamically updated to expand or collapse nodes of tree 300. A control may be incorporated in the display of a tree to allow a user to either "expand" or "collapse" the child nodes of a particular node. To illustrate, if a user selects control 340 as shown in FIG. 3, then the child nodes of node 310 will "collapse," and will cease to be displayed. Thereafter, if a user selects control 340, then the child nodes of node 310 will "expand," and will again be displayed. In this way, a user may update to display of a tree to show the particular portion of the tree in which the user is interested.

While trees are useful in depicting hierarchical data, trees have certain limitations with respect to viewing hierarchical data across different dimensions. Once a tree is populated with data, if a viewer wishes to view the hierarchical data across a different dimension, then another database command to retrieve the desired data may need to be executed, so that the tree can be repopulated with the newly retrieved data. Executing multiple database commands in this manner is not desirable, as it increases the computational resources required as well as the time and effort involved in viewing the desired data.

Tables

Another type of presentation structure is the table. FIG. 4 is an illustration of table 400 according to the prior art. Table 400 may be incorporated as part of a visual presentation generated by presentation manager 120 and shown on display device 112. Table 400 is collection of records, where each record comprises adjacent fields of data. Each row of table 400 corresponds to a distinct record of data. The data type associated with each column of table 400 identifies the type of data stored in a record at the position associated with that column.

Tables are useful for displaying relational data. Relational data is data that is organized based on first-order predicate logic. For example, the data stored in tables of a relational database is relational data. However, tables cannot visually depict any hierarchical relationships that may be present between records of the table.

Tree Tables

A tree table is another type of presentation structure. FIG. 5 is an illustration of tree table 500 according to the prior art. Tree tables are similar to tables in that tree tables are a collection of records, where each record comprises adjacent fields of data. However, in a tree table, one of the columns provides a visual depiction of the hierarchical relationship shared between records of the tree table. The visual depiction of the hierarchical relationship shared between records of the tree table may correspond to a tree of nodes. In effect, the appearance of one column of a tree table is that of a tree of nodes, with each node of the tree depicted in a different row of the tree table, thereby providing the viewer with information about the position of each row within a hierarchy represented by the tree of nodes.

To illustrate, manager column 510 of tree table 500 provides a visual depiction of the hierarchical relationship shared between records of tree table 500. As shown in FIG. 5, record 520 is depicted as being at the top of a hierarchical relationship. Records 522, 526, and 532 are child records of record 520, as visually indicated by manager column 510. As another example, records 528 and 530 are child nodes of record 526, as also visually indicated by manager column 510.

Tree tables advantageously enable a viewer to understand how the records of the tree table relate to each other in a hierarchical relationship. A disadvantage of tree tables, however, is that a tree table does not allow a viewer to view the data stored therein across multiple dimensions.

Matrix Tables

A matrix table is another type of presentation structure. FIG. 6 is an illustration of matrix table 600 according to the prior art. A matrix table is a table that includes a series of rows and a series of columns. Each row of the matrix table is associated with a different dimension instance of a first dimension, and each column of the matrix table is associated with a different dimension instance of a second dimension.

A dimension, as used herein, is a set of related items (individually referred to as a dimension instance) pertaining to a particular topic. A dimension may be used to view data stored in a presentation structure from the perspective of the particular topic associated with the dimension. For example, FIG. 6 depicts two dimensions, namely the job dimension 610 and the department dimension 620. A job dimension instance of job dimension 610 is associated with each column of matrix table 600, and a department dimension instance of department dimension 620 is associated with each row of matrix table 600. Examples of job dimension instances include analyst, clerk, manager, president, and salesmen. Examples of department dimension instances include department 10, department 20, and department 30.

Matrix tables are capable of depicting relational data. Matrix tables are useful in viewing aggregated relational data across two dimension instances. For example, matrix table 600 may depict the average monthly salary of a manager in department 10 is $2,450.00. This salary involves two dimension instances, namely the manager job dimension instance and the department 10 dimension instance.

A disadvantage of a matrix table is that a matrix table can only support exactly two dimensions. For example, matrix table 600 supports job dimension 610 and department dimension 620. However, matrix table 600 can support neither a single dimension nor three or more dimensions.

Another disadvantage of a matrix table is that a matrix table cannot depict hierarchical data. Matrix tables are useful in depicting aggregated data across exactly two dimensions, but they do not provide any mechanism for graphically depicting hierarchical relationships between data.

Matrix Tree Table Presentation Structure

Embodiments of the invention provide improved approaches for displaying data that provide numerous advantages over prior approaches. Further, embodiments of the invention operate under a new paradigm that has not previously been utilized, as embodiments of the invention support new presentation structures that present hierarchical data and relational data in a unified manner.

Figure 7:
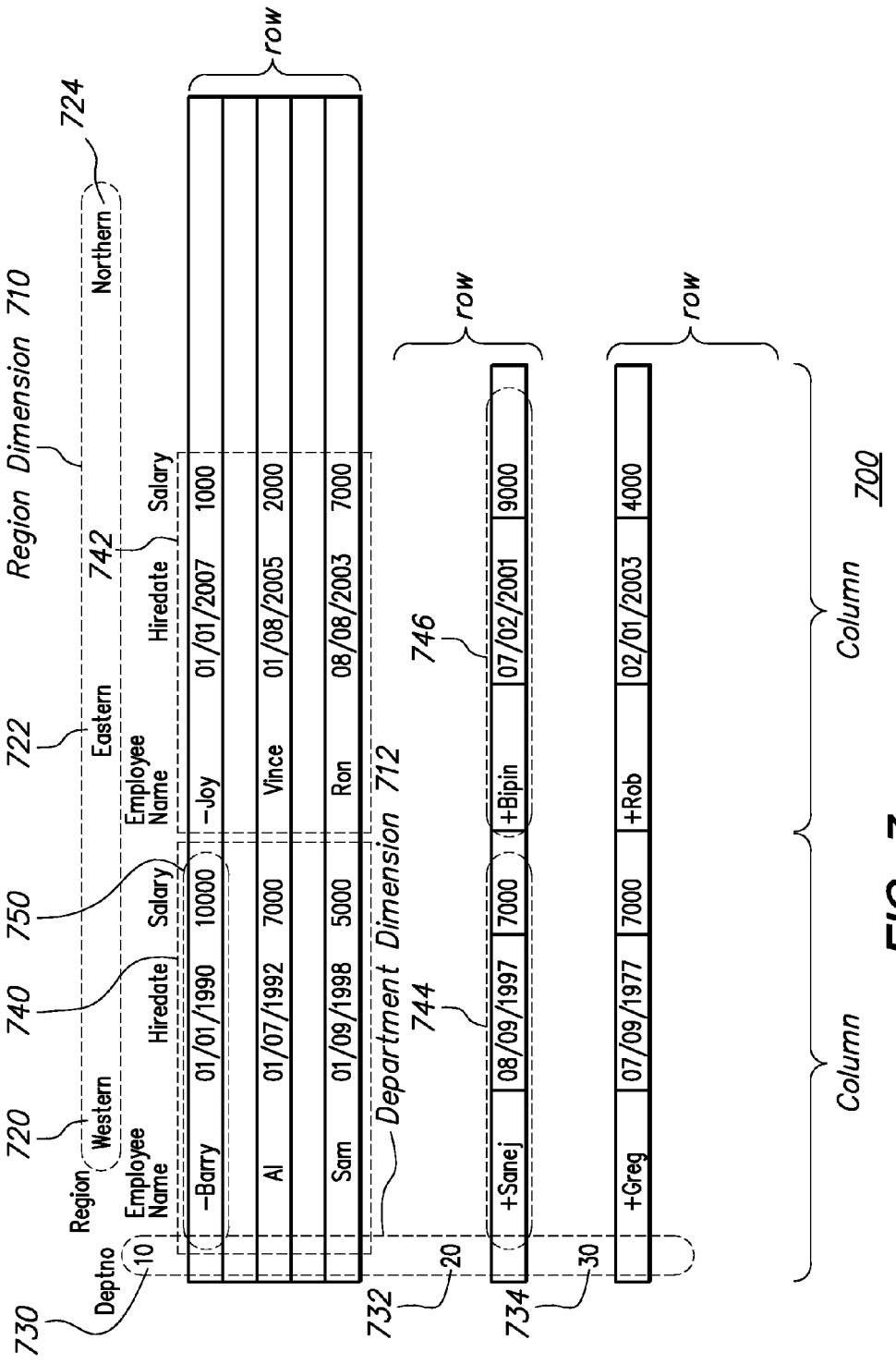
FIG. 7 is an illustration of a matrix tree table presentation structure according to an embodiment of the invention.

In an embodiment of the invention, the visual presentation generated by presentation manager 120 in step 220 of FIG. 2 includes a presentation structure referred to herein as a matrix tree table presentation structure. FIG. 7 is an illustration of matrix tree table presentation structure 700 according to an embodiment of the invention. Matrix tree table presentation structures depict data across two dimensions. For example, matrix tree table presentation structure 700 includes region dimension 710 and department dimension 712. Region dimension 710 includes several region dimension instances, namely western region dimension instance 720, eastern region dimension instance 722, and northern region dimension instance 724. Similarly, department dimension 712 includes several department dimension instances, namely department 10 dimension instance 730, department 20 dimension instance 732, and department 30 dimension instance 734. Note that the particular dimensions of matrix tree table presentation structure 700 illustrated in FIG. 7 are merely examples of two possible dimensions, as any dimension may be used with a matrix tree table presentation structure. The number of dimension instances for each dimension depicted in FIG. 7 is merely exemplary, as each dimension in matrix tree table presentation structure 700 may have any number of dimension instances.

As shown in FIG. 7, each dimension instance of matrix tree table presentation structure 700 is associated with either a row or a column of matrix tree table presentation structure 700. For example, each region dimension instance of region dimension 710 is associated with a column of matrix tree table presentation structure 700, while each department dimension instance of department dimension 712 is associated with a row of matrix tree table presentation structure 700. The intersection of each column and each row is a cell. For example, the intersection of western region dimension instance 720 and department 10 dimension instance 730 is cell 740.

In an embodiment, a tree table may be displayed in each cell of matrix tree table presentation structure 700. For example, inside cell 740 a tree table is displayed. A tree table comprises a tree of nodes, and each node of the tree table includes a row of data. To illustrate, node 750 of the tree table in cell 740 includes a row of data.

Matrix tree table presentation structure 700 is capable of storing both relational data and hierarchical data, as matrix tree table presentation structure 700 can store (a) relational data in its columns and rows, and (b) hierarchal data in a tree table present in a cell of matrix tree table presentation structure 700.

Advantageously, hierarchical data for a different combination of dimension instances may be viewed simultaneously using matrix tree table presentation structure 700. To illustrate, matrix tree table presentation structure 700 displays hierarchical data in tree tables in cells 740 and 742. While the hierarchical data depicted in cells 740 and 742 are both associated with department 10 dimension instance 730, the hierarchical data displayed in cell 740 is associated with western region dimension instance 720 while the hierarchical data displayed in cell 742 is associated with eastern region dimension instance 722. As matrix tree table presentation structure 700 may display hierarchical data in any cell, hierarchical data associated with many different combinations of dimension instances may be viewed simultaneously. By viewing many different combinations of hierarchical data simultaneously, the user may make meaningful comparisons between the sets of hierarchical data.

In an embodiment, a particular cell of matrix tree table presentation structure 700 may not be depicted with a tree table. For example, if hierarchical data is not associated with the particular combination of dimension instances associated with a particular cell, then the particular cell may be displayed without a tree table therein. Thus, there is no requirement that each cell of matrix tree table presentation structure 700 be depicted with a tree table. To illustrate, cells of matrix tree table presentation structure 700 associated with northern region dimension 710 do not contain a tree table.

In an embodiment, for each tree table depicted in a cell of matrix tree table presentation structure 700, only a top level node for the tree table may be depicted. A control may be incorporated in the display of a tree table depicted in a cell of matrix tree table presentation structure 700 which allows a user to either "expand" or "collapse" the child nodes of a particular node. When a particular portion of a tree table depicted in a cell of matrix tree table presentation structure 700 is expanded, the newly expanded child nodes are rendered in a manner that graphically depicts each of the newly expanded child nodes to be child nodes of their parent node. Alternately, when a particular portion of a tree table depicted in a cell of matrix tree table presentation structure 700 is collapsed, the child nodes of a parent node are ceased to be displayed, leaving only the parent node to be displayed. In this way, a user may update the display of a tree table depicted within a cell of matrix tree table presentation structure 700 to show the particular portion of the tree table in which the user is interested.

In an embodiment, if a first tree table depicted in a first cell of a particular row is expanded, and a second tree table depicted in a second cell of the same row has a different number of nodes currently being depicted in its hierarchy, then matrix tree table presentation structure 700 automatically adjusts the spacing of the cells of matrix tree table presentation structure 700 such that each cell is clearly depicted to be associated with its corresponding dimension instances. For example, if a user causes the tree table depicted in cell 746 to expand, and if the expanded tree table in cell 746 has three levels of nodes in its hierarchy of nodes, whereas each tree table depicted in each other cell for the row associated with the department 20 dimension instance has only one level of nodes currently depicted, then open space or empty rows may be added to those other tree tables to ensure proper alignment of all tree tables within cells in the row associated with department 20 dimension instance 732.

In an embodiment, in step 210 of FIG. 2, presentation manager 120 retrieves all necessary data from data storage 130 such that each tree table depicted in each cell of matrix tree table presentation structure 700 is populated in its entirety, regardless of whether a particular tree table in a cell is expanded or collapsed. In this way, if a user chooses to expand a particular tree table displayed in a cell of matrix tree table presentation structure 700, then there is little to no delay in rendering an updated display to depict a portion of a tree table moving from the "collapsed" position to an "expanded" position, as the data necessary to update the display to reflect the expanded nodes of the tree table has already been retrieved from data storage 130.

However, in other embodiments of the invention, in step 210 of FIG. 2, presentation manager 120 retrieves, from data storage 130, only the data necessary to depict the top level node of each tree table depicted in each cell of matrix tree table presentation structure 700. In such an embodiment, if a user instructs matrix tree table presentation structure 700 to expand a particular tree table, then presentation manager 120 will subsequently retrieve, from storage medium 130, the data necessary to depict the expanded tree table. A user may cause a particular tree table to expand or collapse by selecting a control associated with a row of the tree table. For example, the icon with the appearance of "+" displayed before a row of a tree table indicates that when that icon is selected, child nodes for that row will be displayed. Similarly, the icon with the appearance of "−" displayed before a row of a tree table indicates that when that icon is selected, the child nodes for that row will cease to be displayed. In this embodiment, the icon having the appearance of "+" in front of a tree or tree table node indicates that the data for the child nodes has not yet been retrieved from the storage medium 130; however, matrix tree table presentation structure 700 possesses all the underlying information necessary to retrieve the child data from storage medium 130 when so instructed. In this embodiment, the rational for not retrieving all the data from storage medium 130 necessary to depict all the child nodes is to enhance performance, as a user interested in viewing detailed information about the western region may not care to see detailed information about the eastern region. Consequently, in this example, the time and resources involved in retrieving data necessary to depict child nodes in tables and tree tables in the eastern region may be avoided.

In other embodiments, the user may configure the behavior of matrix tree table presentation structure 700 in its performance of step 210 such that the user may indicate whether, for one or more cells of matrix tree table presentation structure 700, presentation manager 120 retrieves, from data storage 130, data necessary to render all nodes of a tree table displayed therein or just the top level node of the tree table displayed therein.

In an embodiment, any datum depicted in matrix tree table presentation structure 700 may be associated with a link such that when the datum is selected by a user, another visual presentation is displayed that contains additional information about the selected datum. For example, cell 746 displays a tree table with a top level node that has a row of data with the values "Bipin," "07/02/2001," and "9000." In an embodiment, if a user selects one of these three values, then a web page may be displayed which contains additional information about the selected node. In this example, additional information about the employee named "Bipin" may be provided on the new web page. In this way, a user may cause display device 112 to be updated to display additional information about any datum depicted in matrix tree table presentation structure 700.

In an embodiment, data depicted in matrix tree table presentation structure 700 may be edited by a user. For example, a user may select data depicted in matrix tree table presentation structure 700 using mouse, keyboard, or similar input device. The user may then cause the data to be updated in the display of matrix tree table presentation structure 700. In an embodiment, updating the display of data in matrix tree table presentation structure 700 causes display manager 110 to instruct presentation manager 120 to update data stored in storage medium 130 to reflect the updated data displayed in matrix tree table presentation structure 700. To illustrate, a user may select node 750 using a mouse, and thereafter update the display of Barry's salary from 10000 to 12000. In an embodiment, updating the salary in this manner causes display manager 110 to instruct presentation manager 120 to update the data corresponding to Barry's salary stored in storage medium 130 to reflect that is salary is now 12000. In embodiments of the invention, the user may also make additions and deletions to tree tables depicted in matrix tree table presentation structure 700, e.g., a user may add rows to a tree table or delete rows of a tree table depicted in matrix tree table presentation structure 700, and subsequently, those additions or deletions may be reflected in the data stored in storage medium 130. In such an embodiment, updates to data presented by matrix tree table presentation structure 700 may be performed in a convenient and intuitive manner.

Having described matrix tree table presentation structure 700 according to an embodiment of the invention, another presentation structure for displaying data according to an embodiment of the invention will now be discussed.

Matrix Tree Presentation Structure

Figure 8:
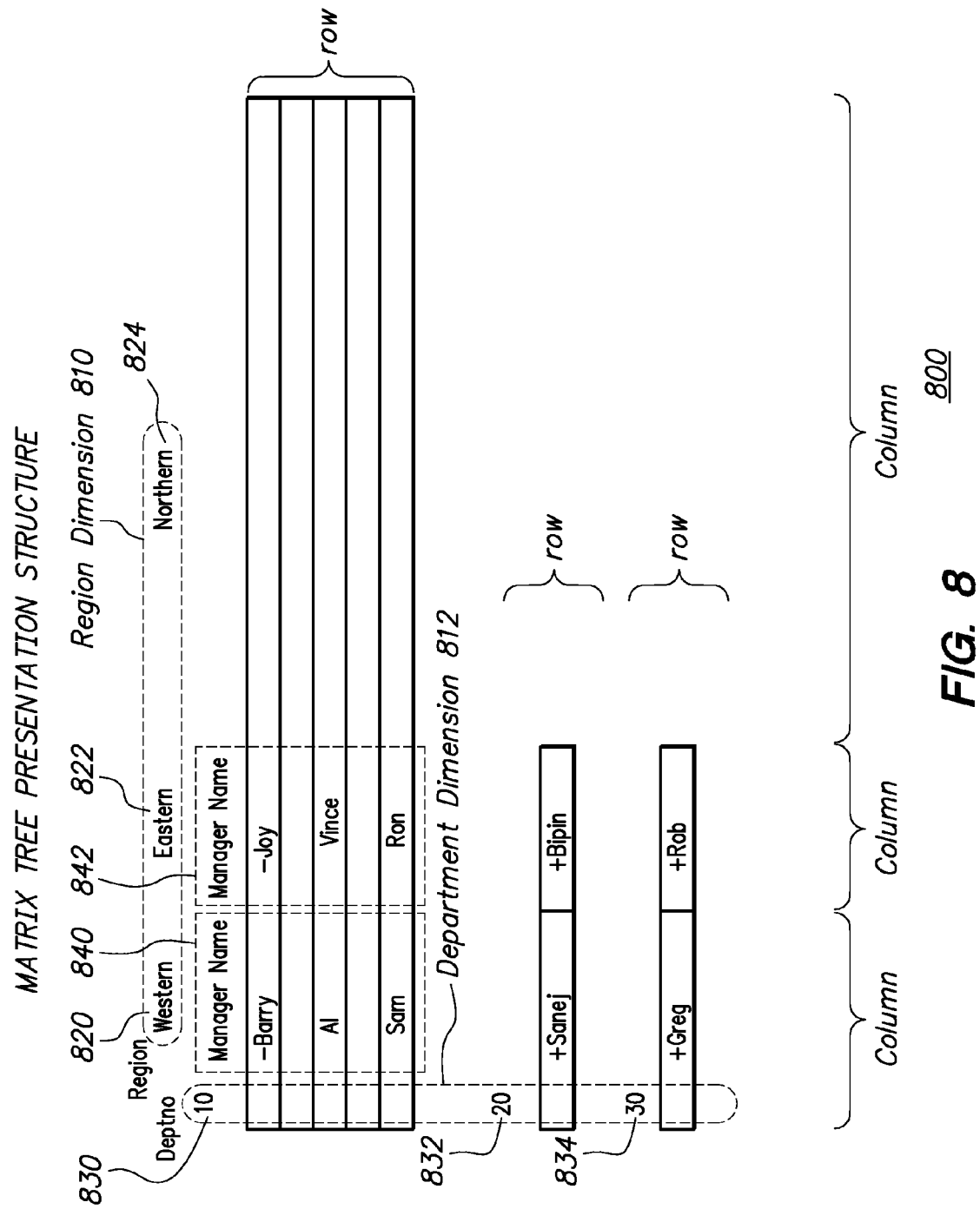
FIG. 8 is an illustration of a matrix tree presentation structure according to an embodiment of the invention.

In an embodiment of the invention, the visual presentation generated by presentation manager 120 in step 220 of FIG. 2 includes a presentation structure referred to herein as a matrix tree presentation structure. FIG. 8 is an illustration of matrix tree presentation structure 800 according to an embodiment of the invention. Matrix tree presentation structure 800 is similar to matrix tree table presentation structure 700, except that in each cell of matrix tree presentation structure 800, a tree of nodes may be depicted instead of a tree table.

Matrix tree presentation structures depict data across two dimensions. For example, matrix tree presentation structure 800 includes region dimension 810 and department dimension 812. Region dimension 810 includes several region dimension instances, namely western region dimension instance 820, eastern region dimension instance 822, and northern region dimension instance 824. Similarly, department dimension 812 includes several department dimension instances, namely department 10 dimension instance 830, department 20 dimension instance 832, and department 30 dimension instance 834. Note that the particular dimensions of matrix tree presentation structure 800 illustrated in FIG. 8 are merely examples of two possible dimensions, as any dimension may be used with a matrix tree presentation structure. The number of dimension instances for each dimension depicted in FIG. 8 is merely exemplary, as each dimension in matrix tree presentation structure 800 may have any number of dimension instances.

As shown in FIG. 8, each dimension instance of matrix tree presentation structure 800 is associated with either a row or a column of matrix tree presentation structure 800. For example, each region dimension instance of region dimension 810 is associated with a column of matrix tree presentation structure 800, while each department dimension instance of department dimension 812 is associated with a row of matrix tree presentation structure 800. The intersection of each column and each row is a cell. For example, the intersection of western region dimension instance 820 and department 10 dimension instance 830 is cell 840.

In an embodiment, a tree may be displayed in each cell of matrix tree presentation structure 800. For example, inside cell 840 is a tree of nodes. Matrix tree presentation structure 800 is capable of storing both relational data and hierarchical data, as matrix tree presentation structure 800 can store (a) relational data in its columns and rows, and (b) hierarchal data in a tree present in a cell of matrix tree presentation structure 800.

Advantageously, hierarchical data for a different combination of dimension instances may be viewed simultaneously using matrix tree presentation structure 800. To illustrate, matrix tree presentation structure 800 displays hierarchical data in cells 840 and 842. While the hierarchical data depicted in cells 840 and 842 are both associated with department 10 dimension instance 830, the hierarchical data displayed in cell 840 is associated with western region dimension instance 720 while the hierarchical data displayed in cell 842 is associated with eastern region dimension instance 822. As matrix tree presentation structure 800 may display hierarchical data in any cell, hierarchical data associated with many different combinations of dimension instances may be viewed simultaneously. By viewing many different combinations of hierarchical data simultaneously, the user may make meaningful comparisons between the sets of hierarchical data.

In an embodiment, a particular cell of matrix tree presentation structure 800 may not be depicted with a tree. For example, if hierarchical data is not associated with the particular combination of dimension instances associated with a particular cell, then the particular cell may be displayed without depicting a tree therein. Thus, there is no requirement that each cell of matrix tree presentation structure 800 be depicted with a tree table. To illustrate, cells of matrix tree presentation structure 800 associated with northern region dimension 810 do not contain a tree.

In an embodiment, for each tree depicted in a cell of matrix tree presentation structure 800, only a top level node for the tree may be depicted. A control may be incorporated in the display of a tree depicted in a cell of matrix tree presentation structure 800 which allows a user to either "expand" or "collapse" the child nodes of a particular node. When a particular portion of a tree depicted in a cell of matrix tree presentation structure 800 is expanded, the newly expanded child nodes are rendered in a manner that graphically depicts each of the newly expanded child nodes to be child nodes of their parent node. When a particular portion of a tree depicted in a cell of matrix tree presentation structure 800 is collapsed, the child nodes of a parent node are ceased to be displayed, leaving only the parent node to be displayed. In this way, a user may update the display of a tree depicted within a cell of matrix tree presentation structure 800 to show the particular portion of the tree in which the user is interested.

In an embodiment, if a first tree depicted in a first cell of a particular row is expanded, and a second tree depicted in a second cell of the same row has a different number of nodes currently being depicted in its hierarchy, then matrix tree presentation structure 800 automatically adjusts the spacing of the cells of matrix tree presentation structure 800 such that each cell is clearly depicted to be associated with its corresponding dimension instances. For example, if a user causes the tree depicted in cell 842 to expand to show three levels of nodes, whereas only the top level node of the tree depicted in cell 840 is currently being shown, then open space or empty rows may be added in the display of matrix tree presentation structure 800 to ensure proper alignment of all trees so that they are clearly depicted with their corresponding dimension instances.

In an embodiment, in step 210 of FIG. 2, presentation manager 120 retrieves all necessary data from data storage 130 such that each tree depicted in each cell of matrix tree presentation structure 800 is populated in its entirety, regardless of whether a particular tree in a cell is expanded or collapsed. In this way, if a user chooses to expand a particular tree displayed in a cell of matrix tree presentation structure 800, then there is little to no delay in rendering an updated display to depict a portion of a tree moving from the "collapsed" position to an "expanded" position, as the data necessary to update the display to reflect the expanded nodes of the tree has already been retrieved from data storage 130. However, in other embodiments of the invention, in step 210 of FIG. 2, presentation manager 120 retrieves, from data storage 130, only the data necessary to depict the top level node of each tree depicted in each cell of matrix tree presentation structure 800. In such an embodiment, if a user instructs matrix tree presentation structure 800 to expand a particular tree, then presentation manager 120 will subsequently retrieve, from storage medium 130, the data necessary to depict the expanded tree. In other embodiments, the user may configure the behavior of matrix tree presentation structure 800 in its performance of step 210 such that the user may indicate whether, for one or more cells of matrix tree presentation structure 800, presentation manager 120 retrieves, from data storage 130, data necessary to render all nodes of a tree, or just the top level node of a tree, for each tree depicted in matrix tree presentation structure 800.

In an embodiment, any datum depicted in matrix tree presentation structure 800 may be associated with a link such that when the datum is selected by a user, another visual presentation is displayed that contains additional information about the selected datum. For example, cell 842 displays a tree with a top level node that has a row of data having the value "Joy." In an embodiment, if a user selects the value "Joy" in this tree, then a web page may be displayed which contains additional information about the selected node. In this example, additional information about the employee named "Joy" may be provided on the new web page. In this way, a user may cause display device 112 to be updated to display additional information about any datum depicted in matrix tree presentation structure 800.

In an embodiment, data depicted in matrix tree presentation structure 800 may be edited by a user. For example, a user may select data depicted in matrix tree presentation structure 800 using mouse, keyboard, or similar input device. The user may then cause the data to be updated in the display of matrix tree presentation structure 800. In an embodiment, updating the display of data in matrix tree presentation structure 800 causes display manager 110 to instruct presentation manager 120 to update data stored in storage medium 130 to reflect the updated data displayed in matrix tree presentation structure 800. To illustrate, a user may select a node of the tree depicted in cell 842 using a mouse, and thereafter update the display of the information depicted in that node, e.g., a user may change the name of Vince to David. In an embodiment, updating the name depicted in that node in this manner causes display manager 110 to instruct presentation manager 120 to update the data corresponding to that node stored in storage medium 130 to reflect that the data associated with that node is now "David." In embodiments of the invention, the user may also make additions and deletions to tables depicted in matrix tree presentation structure 800, e.g., a user may add nodes to a tree or delete nodes to a tree depicted in matrix tree presentation structure 800, and subsequently, those additions or deletions may be reflected in the data stored in storage medium 130. In such an embodiment, updates to data presented by matrix tree presentation structure 800 may be performed in a convenient and intuitive manner.

Having described matrix tree presentation structure 800 according to an embodiment of the invention, another presentation structure for displaying data according to an embodiment of the invention will now be discussed.

Nested Dimension Tree Presentation Structure

Figure 9A:
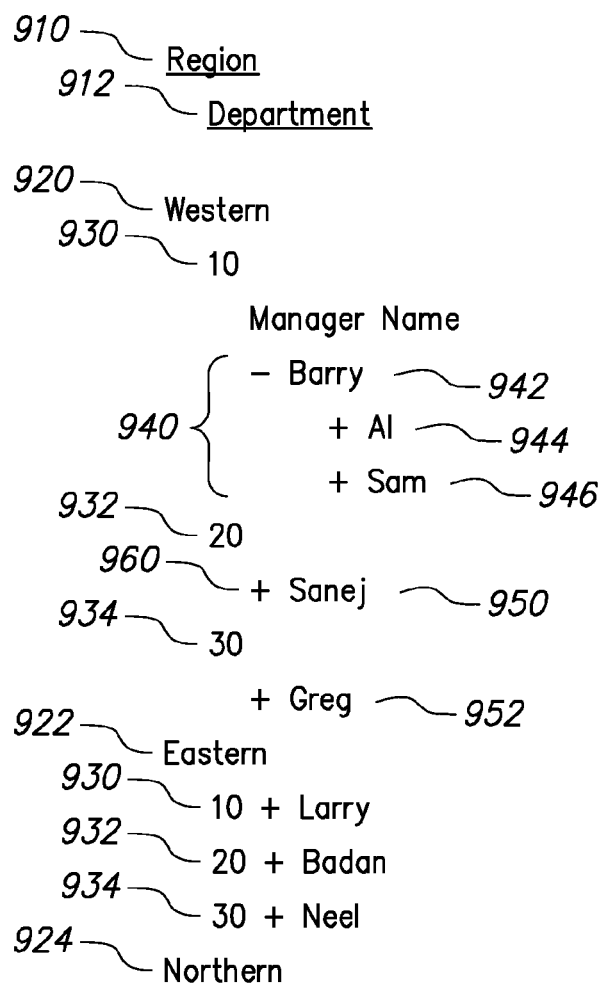
FIG. 9A is an illustration of a first nested dimension tree presentation structure according to an embodiment of the invention.

In an embodiment of the invention, the visual presentation generated by presentation manager 120 in step 220 of FIG. 2 includes a presentation structure referred to herein as a nested dimension tree presentation structure. FIG. 9A is an illustration of nested dimension tree presentation structure 900 according to an embodiment of the invention.

As depicted in FIG. 9A, nested dimension tree presentation structure 900 includes two dimensions, namely region dimension 910 and department dimension 912. Region dimension 910 includes several dimension instances, namely western region dimension instance 920, eastern region dimension instance 922, and northern region dimension instance 924. Department dimension 912 includes several dimension instances as well, namely department 10 dimension instance 930, department 20 dimension instance 932, and department 30 dimension instance 934. The position of each dimension instance in nested dimension tree presentation structure 900 is aligned under the name of the dimension of which it belongs. The number of dimension instances for each dimension depicted in FIG. 9A is merely exemplary, as each dimension in nested dimension tree presentation structure 900 may have any number of dimension instances.

Nested dimension tree presentation structure 900 depicts region dimension 910 and department dimension 912 in a "nested" manner. That is to say, the dimensions of nested dimension tree presentation structure 900 share a sequential relationship, wherein each dimension in the sequence has a position ranging from the highest position to the lowest position. As shown in FIG. 9A, region dimension 910 has the highest position in the sequence, and department dimension 912 has the lowest position in the sequence. The sequential relationship of the dimensions are graphically portrayed similar to the layers of an onion, with the higher positioned dimensions closer to the exterior (i.e., further way from where the trees of hierarchal data are depicted), and the lower positioned dimensions closer to the interior (i.e., closer to where the trees of hierarchal data are depicted).

In an embodiment, the sequential relationship of the dimensions impacts the alignment of the dimensions and dimension instances in nested dimension tree presentation structure 900. For example, the lower a dimension's position (and by extension their dimension instances positions) is in the sequential relationship of the dimensions, the further the indentation of the dimension (and by extension their dimension instances) will be in nested dimension tree presentation structure 900.

Advantageously, nested dimension tree presentation structure 900 may be configured to display data using any number (zero or more) of dimensions. The number of dimensions incorporated as part of nested dimension tree presentation structure 900 may be configured by a user. A user may submit, to presentation manger 120, user input that identifies (a) how many dimensions to include as part of nested dimension tree presentation structure 900 and (b) what dimensions, including their corresponding dimensional instances, should be included as part of nested dimension tree presentation structure 900.

Figure 9B:
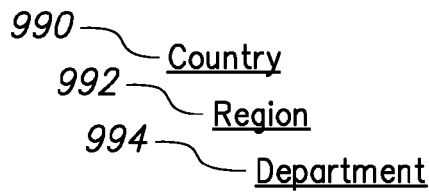
FIG. 9B is an illustration of a second nested dimension tree presentation structure according to an embodiment of the invention.

To illustrate, FIG. 9B is an illustration of nested dimension tree presentation structure 980 according to an embodiment of the invention. Nested dimension tree presentation structure 980 uses three dimensions, namely country dimension 990, region dimension 992, and department dimension 994. As shown in FIG. 9B, each dimension and their corresponding dimension instances are positioned according to their relative position in the sequential relationship between dimensions, as country dimension 990 is the highest positioned dimension and department dimension 994 is the lowest positioned dimension.

If there is any hierarchical data associated with a particular dimensional instance of the lowest positioned dimension, then a tree depicting the associated hierarchical data is shown in association with the particular dimensional instance. For example, in the embodiment depicted in FIG. 9A, there is hierarchical data associated with department 10 dimension instance 930 for the western region dimension instance 920; accordingly, tree 940 is depicted in nested dimension tree presentation structure 900 in association with that occurrence of department 10 dimension instance 930.

In an embodiment of the invention, if there is no hierarchical data associated with a particular dimensional instance of the lowest positioned dimension in the sequence of dimensions, then a tree is not shown in association with the particular dimensional instance. In an embodiment, if there is no hierarchical data associated with a particular dimensional instance of the lowest positioned dimension, then in addition to not depicting a tree with that particular dimension instance, the particular dimension instance itself is also not depicted in the nested dimension tree presentation structure. For example, in the embodiment depicted in FIG. 9B, there is no hierarchical data associated with department 20 dimension instance for the western region dimension instance for the England country dimension instance; accordingly, neither a tree nor an occurrence of department 20 dimension instance for the western region dimension instance for the England country dimension instance is depicted in nested dimension tree presentation structure 980.

In an embodiment of the invention, if, for a particular dimension instance of a dimension which is not the lowest, there is no hierarchical data associated with any lower dimensional instances for that particular dimension instance, then that particular dimension instance itself is not shown in the nested dimension tree presentation structure. For example, in the embodiment depicted in FIG. 9B, there is no hierarchical data associated with any department dimension instance for the northern region dimension instance for the United States country dimension instance; accordingly, the northern region dimension instance for the United States country dimension instance is not depicted in nested dimension tree presentation structure 980.

The visual display of a tree depicted in nested dimension tree presentation structure 900 may be dynamically updated to expand or collapse nodes of the tree. A control may be incorporated in the display of a tree to allow a user to either "expand" or "collapse" the child nodes of a particular node. To illustrate, if a user selects control 960 as shown in FIG. 9A, then the child nodes of node 950 will "expand," and the child nodes of node 950 will be displayed. Thereafter, if a user selects control 960, then the child nodes of node 950 will "collapse" and the child nodes of node 950 will cease to be displayed. In this way, a user may update to display of a tree in nested dimension tree presentation structure 900 to show the particular portion of the tree in which the user is interested.

In an embodiment, in step 210 of FIG. 2, presentation manager 120 retrieves all necessary data from data storage 130 such that each tree depicted in nested dimension tree presentation structure 900 is populated in its entirety, regardless of whether a particular tree in initially depicted as being expanded or collapsed. In this way, if a user chooses to expand a particular tree displayed in nested dimension tree presentation structure 900, then there is little to no delay in rendering an updated display to depict the portion of a tree moving from the "collapsed" position to an "expanded" position, as the data necessary to update the display to reflect the expanded nodes of the tree has already been retrieved from data storage 130. However, in other embodiments of the invention, in step 210 of FIG. 2, presentation manager 120 retrieves, from data storage 130, only the data necessary to depict the top level node of each tree depicted in nested dimension tree presentation structure 900. In such an embodiment, if a user instructs nested dimension tree presentation structure 900 to expand a particular tree, then presentation manager 120 will subsequently retrieve, from storage medium 130, the data necessary to depict the expanded tree. In other embodiments, the user may configure the behavior of nested dimension tree presentation structure 900 in its performance of step 210 such that the user may indicate whether, for each tree depicted in nested dimension tree presentation structure 900, presentation manager 120 retrieves, from data storage 130, data necessary to render all nodes of the tree or just the top level node of the tree.

In an embodiment, any datum depicted in nested dimension tree presentation structure 900 may be associated with a link such that when the datum is selected by a user, another visual presentation is displayed that contains additional information about the selected datum. For example, the top level node of tree 952, as displayed in FIG. 9A, has the value "Greg." In an embodiment, if a user selects the value "Greg" in this tree, then a web page may be displayed which contains additional information about the selected node. In this example, additional information about the employee named "Greg" may be provided on the new web page. In this way, a user may cause display device 112 to be updated to display additional information about any datum depicted in nested dimension tree presentation structure 900.

Embodiments of the invention employing nested dimension tree presentation structure 900 advantageously enable a user to view multiple sets of hierarchical data in nested dimension tree presentation structure 900. Further, the multiple sets of hierarchical data may be organized based on a configurable number of dimensions, which may include a plurality of two or more, a single dimension, or no dimensions.

In an embodiment, data depicted in nested dimension tree presentation structure 900 may be edited by a user. For example, a user may select data depicted in nested dimension tree presentation structure 900 using mouse, keyboard, or similar input device. The user may then cause the data to be updated in the display of nested dimension tree presentation structure 900. In an embodiment, updating the display of data in nested dimension tree presentation structure 900 causes display manager 110 to instruct presentation manager 120 to update data stored in storage medium 130 to reflect the updated data displayed in nested dimension tree presentation structure 900. To illustrate, a user may select node 944 using a mouse, and thereafter update the display of the name associated with node 944 from "Al" to "Allen." In an embodiment, updating the name in this manner causes display manager 110 to instruct presentation manager 120 to update the data corresponding to the data associated with node 944 stored in storage medium 130 to reflect that the name has been updated to "Allen." In embodiments of the invention, the user may also make additions and deletions to trees or dimensions depicted in nested dimension tree presentation structure 900, e.g., a user may (a) add nodes to a tree or delete nodes of a tree depicted in nested dimension tree presentation structure 900 or (b) add or delete a dimension depicted in nested dimension tree presentation structure 900, and subsequently, those additions or deletions may be reflected in the data stored in storage medium 130. In such an embodiment, updates to data presented by nested dimension tree presentation structure 900 may be performed in a convenient and intuitive manner.

Having described nested dimension tree presentation structure 900 according to an embodiment of the invention, another presentation structure for displaying data according to an embodiment of the invention will now be discussed.

Nested Dimension Tree Table Presentation Structure

In an embodiment of the invention, the visual presentation generated by presentation manager 120 in step 220 of FIG. 2 includes a presentation structure referred to herein as a nested dimension tree table presentation structure. FIG. 10A is an illustration of nested dimension tree table presentation structure 1000 according to an embodiment of the invention. Nested dimension tree table presentation structure 1000 is similar to nested dimension tree presentation structure 900, except that a tree table is depicted in nested dimension tree table presentation structure 1000 where a tree of nodes would be depicted in nested dimension tree presentation structure 900.

As depicted in FIG. 10A, nested dimension tree table presentation structure 1000 includes two dimensions, namely region dimension 1010 and department dimension 1012. Region dimension 1010 includes several dimension instances, namely western region dimension instance 1020, eastern region dimension instance 1022, and northern region dimension instance 1024. Department dimension 1012 includes several dimension instances as well, namely department 10 dimension instance 1030, department 20 dimension instance 1032, and department 30 dimension instance 1034. The position of each dimension instance in nested dimension tree table presentation structure 1000 is aligned under the name of the dimension of which it belongs. The number of dimension instances for each dimension depicted in FIG. 10A is merely exemplary, as each dimension in nested dimension tree table presentation structure 1000 may have any number of dimension instances.

Nested dimension tree table presentation structure 1000 depicts region dimension 1010 and department dimension 1012 in a "nested" manner. That is to say, the dimensions of nested dimension tree table presentation structure 1000 share a sequential relationship, wherein each dimension in the sequence has a position ranging from the highest position to the lowest position. As shown in FIG. 10A, region dimension 1010 has the highest position in the sequence, and department dimension 1012 has the lowest position in the sequence. The sequential relationship of the dimensions are graphically portrayed similar to the layers of an onion, with the higher positioned dimensions closer to the exterior (i.e., further way from where the tree tables of hierarchal data are depicted), and the lower positioned dimensions closer to the interior (i.e., closer to where the tree tables of hierarchal data are depicted).

In an embodiment, the sequential relationship of the dimensions impacts the alignment of the dimensions and dimension instances in nested dimension tree table presentation structure 1000. For example, the lower a dimension's position (and by extension their dimension instances positions) is in the sequential relationship of the dimensions, the further the indentation of the dimension (and by extension their dimension instances) will be in nested dimension tree table presentation structure 1000.

Advantageously, nested dimension tree table presentation structure 1000 may be configured to display data using any number (zero or more) of dimensions. The number of dimensions incorporated as part of nested dimension tree table presentation structure 1000 may be configured by a user. A user may submit, to presentation manger 120, user input that identifies (a) how many dimensions to include as part of nested dimension tree table presentation structure 1000 and (b) what dimensions, including their corresponding dimensional instances, should be included as part of nested dimension tree table presentation structure 1000.

To illustrate, FIG. 10B is an illustration of nested dimension tree table presentation structure 1080 according to an embodiment of the invention. Nested dimension tree table presentation structure 1080 uses three dimensions, namely country dimension 1090, region dimension 1092, and department dimension 1094. As shown in FIG. 10B, each dimension and their corresponding dimension instances are positioned according to their relative position in the sequential relationship between dimensions, as country dimension 1090 is the highest positioned dimension and department dimension 1094 is the lowest positioned dimension.

If there is any hierarchical data associated with a particular dimensional instance of the lowest positioned dimension, then a tree table depicting the associated hierarchical data is shown in association with the particular dimensional instance. For example, in the embodiment depicted in FIG. 10A, there is hierarchical data associated with department 10 dimension instance 1030 for the western region dimension instance 1020; accordingly, tree table 1040 is depicted in nested dimension tree table presentation structure 1000 in association with that occurrence of department 10 dimension instance 1030.

In an embodiment of the invention, if there is no hierarchical data associated with a particular dimensional instance of the lowest positioned dimension, then a tree table is not shown in association with the particular dimensional instance. In an embodiment, if there is no hierarchical data associated with a particular dimensional instance of the lowest positioned dimension, then in addition to not depicting a tree table with that particular dimension instance, the particular dimension instance itself is also not depicted in the nested dimension tree table presentation structure. For example, in the embodiment depicted in FIG. 10B, there is no hierarchical data associated with department 20 dimension instance for the western region dimension instance for the England country dimension instance; accordingly, neither a tree table nor an occurrence of department 20 dimension instance for the western region dimension instance for the England country dimension instance is depicted in nested dimension tree table presentation structure 1080.

In an embodiment of the invention, if, for a particular dimension instance of a dimension which is not the lowest, there is no hierarchical data associated with any lower dimensional instances for that particular dimension instance, then that particular dimension instance itself is not shown in the nested dimension tree table presentation structure. For example, in the embodiment depicted in FIG. 10B, there is no hierarchical data associated with any department dimension instance for the northern region dimension instance for the United States country dimension instance; accordingly, the northern region dimension instance for the United States country dimension instance is not depicted in nested dimension tree presentation structure 980.

The visual display of a tree table depicted in nested dimension tree table presentation structure 1000 may be dynamically updated to expand or collapse nodes of the tree depicted within one of the columns of the tree table. A control may be incorporated in the display of a tree depicted within one of the columns of the tree table that allows a user to either "expand" or "collapse" the child nodes of a particular node. To illustrate, if a user selects control 1060 as shown in FIG. 10A, then the child nodes of node 1050 will "expand," and the child nodes of node 1050 will be displayed. Thereafter, if a user selects control 1060, then the child nodes of node 1050 will "collapse" and the child nodes will cease to be displayed. In this way, a user may update to display of a tree table in nested dimension tree table presentation structure 1000 to show the particular portion of the tree in which the user is interested.

In an embodiment, in step 210 of FIG. 2, presentation manager 120 retrieves all necessary data from data storage 130 such that each tree table depicted in nested dimension tree table presentation structure 1000 is populated in its entirety, regardless of whether a particular tree table is expanded or collapsed. In this way, if a user chooses to expand a particular tree table displayed in nested dimension tree table presentation structure 1000, then there is little to no delay in rendering an updated display to depict a portion of a tree table moving from the "collapsed" position to an "expanded" position, as the data necessary to update the display to reflect the expanded nodes of the tree table has already been retrieved from data storage 130. However, in other embodiments of the invention, in step 210 of FIG. 2, presentation manager 120 retrieves, from data storage 130, only the data necessary to depict the top level node of each tree table depicted in nested dimension tree table presentation structure 1000. In such an embodiment, if a user instructs nested dimension tree table presentation structure 1000 to expand a particular tree table, then presentation manager 120 will subsequently retrieve, from storage medium 130, the data necessary to depict the expanded tree table. In other embodiments, the user may configure the behavior of nested dimension tree table presentation structure 1000 in its performance of step 210 such that the user may indicate whether, for one or more tree tables of nested dimension tree table presentation structure 1000, presentation manager 120 retrieves, from data storage 130, data necessary to render all nodes of the tree table or just the top level node of the tree table.

In an embodiment, any datum depicted in nested dimension tree table presentation structure 1000 may be associated with a link such that when the datum is selected by a user, another visual presentation is displayed that contains additional information about the selected datum. For example, the top level node of tree table 1040, as displayed in FIG. 10A, has the values "Barry," "01/01/1990," and "10000." In an embodiment, if a user selects any of these values, then a web page may be displayed which contains additional information about the selected node. In this example, additional information about the employee named "Barry" may be provided on the new web page. In this way, a user may cause display device 112 to be updated to display additional information about any datum depicted in nested dimension tree table presentation structure 1000.

In an embodiment, data depicted in nested dimension tree table presentation structure 1000 may be edited by a user. For example, a user may select data in nested dimension tree table presentation structure 1000 using mouse, keyboard, or similar input device. The user may then cause the data to be updated in the display of nested dimension tree table presentation structure 1000. In an embodiment, updating the display of data in nested dimension tree table presentation structure 1000 causes display manager 110 to instruct presentation manager 120 to update data stored in storage medium 130 to reflect the updated data displayed in nested dimension tree table presentation structure 1000. To illustrate, a user may select node 1050 using a mouse, and thereafter update the display of Sanej's salary from 7000 to 10000. In an embodiment, updating the salary in this manner causes display manager 110 to instruct presentation manager 120 to update the data corresponding to Sanej's salary stored in storage medium 130 to reflect that is salary is now 10000. In embodiments of the invention, the user may also make additions and deletions to tree tables depicted in dimension tree table presentation structure 1000, e.g., a user may either (a) add rows to a tree table or delete rows of a tree table depicted in dimension tree table presentation structure 1000 or (b) add or delete dimensions depicted in dimension tree table presentation structure 1000, and subsequently, those additions or deletions may be reflected in the data stored in storage medium 130. In such an embodiment, updates to data presented by dimension tree table presentation structure 1000 may be performed in a convenient and intuitive manner.

Embodiments of the invention employing nested dimension tree table presentation structure 1000 advantageously enable a user to view multiple sets of hierarchical data in nested dimension tree table presentation structure 1000. Further, the multiple sets of hierarchical data may be organized based on a configurable number of dimensions, which may include a plurality of two or more, a single dimension, or no dimensions.

Implementing Mechanisms

Presentation structures, such as matrix tree table presentation structure 700, matrix tree presentation structure 800, nested dimension tree presentation structures 900 and 980, and nested dimension tree table presentation structures 1000 and 1080, may each be implemented using a variety of types of technology. To illustrate, non-limiting, illustrative examples of technologies that may be used to implement a presentation structure include HTML, DHTML, Java, JSP, JavaScript, or any combination thereof. The particular type of technology used to implement the presentation structure typically depends upon the context in which it is deployed.

Figure 11:
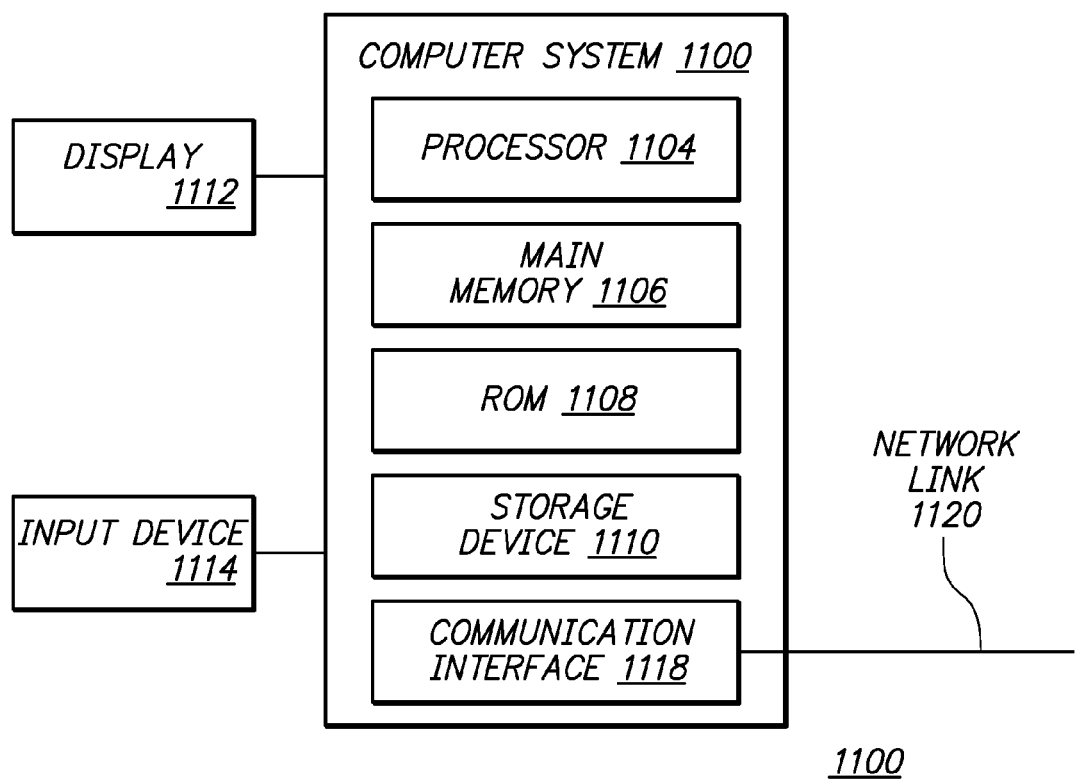
FIG. 11 is a block diagram that illustrates a computer system upon which an embodiment of the invention may be implemented.

In an embodiment, one or more of display manager 110, presentation manager 120 and storage medium 130 may each be implemented using a computer system. FIG. 11 is a block diagram that illustrates a computer system 1100 upon which an embodiment of the invention may be implemented. In an embodiment, computer system 1100 includes processor 1104, main memory 1106, ROM 1108, storage device 1110, and communication interface 11518. Computer system 1100 includes at least one processor 1104 for processing information. Computer system 1100 also includes a main memory 1106, such as a random access memory (RAM) or other dynamic storage device, for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device for storing static information and instructions for processor 1104. A storage device 1110, such as a magnetic disk or optical disk, is provided for storing information and instructions.

Computer system 1100 may be coupled to a display 1112, such as a cathode ray tube (CRT), a LCD monitor, and a television set, for displaying information to a user. An input device 1114, including alphanumeric and other keys, is coupled to computer system 1100 for communicating information and command selections to processor 1104. Other non-limiting, illustrative examples of input device 1114 include a mouse, a trackball, or cursor direction keys for communicating direction information and command selections to processor 1104 and for controlling cursor movement on display 1112. While only one input device 1114 is depicted in FIG. 11, embodiments of the invention may include any number of input devices 1114 coupled to computer system 1100.

Embodiments of the invention are related to the use of computer system 1100 for implementing the techniques described herein. According to one embodiment of the invention, those techniques are performed by computer system 1100 in response to processor 1104 executing one or more sequences of one or more instructions contained in main memory 1106. Such instructions may be read into main memory 1106 from another machine-readable medium, such as storage device 1110. Execution of the sequences of instructions contained in main memory 1106 causes processor 1104 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any medium that participates in storing instructions which may be provided to processor 1104 for execution. Such a medium may take many forms, including but not limited to, non-volatile media and volatile media. Non-volatile media includes, for example, optical or magnetic disks, such as storage device 1110. Volatile media includes dynamic memory, such as main memory 1106.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a network link 1120 to computer system 1100.

Communication interface 1118 provides a two-way data communication coupling to a network link 1120 that is connected to a local network. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through a local network to a host computer or to data equipment operated by an Internet Service Provider (ISP).

Computer system 1100 can send messages and receive data, including program code, through the network(s), network link 1120 and communication interface 1118. For example, a server might transmit a requested code for an application program through the Internet, a local ISP, a local network, subsequently to communication interface 1118. The received code may be executed by processor 1104 as it is received, and/or stored in storage device 1110, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for rendering data on a display, comprising:
rendering a matrix table on said display, wherein said matrix table comprises a plurality of matrix-level columns and a plurality of matrix-level rows;
wherein a first matrix-level column in said plurality of matrix-level columns contains data pertaining to a first instance of a first dimension, said first matrix-level column being identified on said display by a first matrix-level column name;
wherein a second matrix-level column in said plurality of matrix-level columns contains data pertaining to a second instance of said first dimension, said second matrix-level column being identified on said display by a second matrix-level column name;
wherein a first matrix-level row in said plurality of matrix-level rows contains data pertaining to a first instance of a second dimension, said first matrix-level row being identified on said display by a first matrix-level row name;
wherein a second matrix-level row in said plurality of matrix-level rows contains data pertaining to a second instance of said second dimension, said second matrix-level row being identified on said display by a second matrix-level row name;
wherein the first dimension is displayed perpendicular to said second dimension;
wherein said matrix table comprises a plurality of matrix-level cells formed by intersection of each matrix-level column in said plurality of matrix-level columns, with each matrix-level row in said plurality of matrix-level rows;
rendering, within at least a first matrix-level cell of said matrix table, a first expandable tree by including in a first cell-level row within a common matrix-level row in the plurality of matrix-level rows, a first top level node and a first control which allows expanded display of child nodes of the first top level node in additional cell-level rows in said common matrix-level row; and
rendering, within at least a second matrix-level cell of said matrix table, a second expandable tree by including in said first cell-level row within said common matrix-level row, a second top level node and a second control which allows expanded display of at least one child node of the second top level node in at least one of said additional cell-level rows in the common matrix-level row;
wherein said first expandable tree and said second expandable tree are displayed next to one another within said common matrix-level row, in the first matrix-level column and in the second matrix-level column respectively; and
wherein a plurality of first cell-level columns in the first matrix-level cell are identified in said display by a plurality of column names, and a plurality of second cell-level columns in the second matrix-level cell are identified in said display by another plurality of column names.

2. The method of claim 1, wherein said first expandable tree comprises one or more child nodes of said first top level node, and wherein only said first top level node of said first expandable tree of nodes is rendered on said display.

3. The method of claim 1, wherein said first expandable tree comprises one or more child nodes of said first top level node, and wherein only said first top level node of said first expandable tree of nodes is initially rendered on said display, and wherein the method further comprises:
in response to receiving user input, causing said one or more child nodes of said first top level node to be rendered on said display in a manner that graphically depicts each of said one or more child nodes to be child nodes of said first top level node.

4. The method of claim 1, wherein first expandable tree comprises one or more child nodes of said first top level node, and wherein only said first top level node of said first expandable tree of nodes is initially rendered on said display, and wherein the method further comprises, in response to receiving user input that selects said first top level node:
retrieving child data corresponding to said one or more child nodes of said first top level node, wherein said retrieving said child data is not performed until after said user input is received; and
updating said display to render said one or more child nodes on said display using said child data obtained by said retrieving.

5. The method of claim 1, wherein said data rendered on said display includes both hierarchical data and relational data, wherein said hierarchical data is rendered in said first expandable tree of nodes, and wherein said relational data is rendered in said matrix table.

6. The method of claim 1, wherein one or more cells of said matrix table do not contain another tree table.

7. The method of claim 1, wherein a particular node of said first expandable tree of nodes contains a link to a web page that contains additional information about said particular node.

8. A method for rendering data on a display, comprising:
rendering a matrix table on said display, wherein said matrix table comprises a plurality of matrix-level columns and a plurality of matrix-level rows;
wherein a first matrix-level column in said plurality of matrix-level columns contains data pertaining to a first instance of a first dimension, said first matrix-level column being identified on said display by a first matrix-level column name;
wherein a second matrix-level column in said plurality of matrix-level columns contains data pertaining to a second instance of said first dimension, said second matrix-level column being identified on said display by a second matrix-level column name;

wherein a first matrix-level row in said plurality of matrix-level rows contains data pertaining to a first instance of a second dimension, said first matrix-level row being identified on said display by a first matrix-level row name;

wherein a second matrix-level row in said plurality of matrix-level rows contains data pertaining to a second instance of said second dimension, said second matrix-level row being identified on said display by a second matrix-level row name;

wherein the first dimension is displayed perpendicular to said second dimension;

wherein said matrix table comprises a plurality of matrix-level cells formed by intersection of each matrix-level column of said matrix table with each matrix-level row of said matrix table;

wherein a first matrix-level cell and a second matrix-level cell in said plurality of matrix-level cells are both present in a common matrix-level row in said plurality of matrix-level rows;

rendering, within at least the first matrix-level cell of said matrix table, a first expandable tree of nodes by including in a first cell-level row within a common matrix-level row in the plurality of matrix-level rows, a first top level node and a first control which allows expanded display of child nodes of the first top level node in additional cell-level rows in said common matrix-level row; and rendering, within at least the second matrix-level cell of said matrix table, a second expandable tree of nodes by including in said first cell-level row within said common matrix-level row, a second top level node and a second control which allows expanded display of at least one child node of the second top level node in at least one of said additional cell-level rows in the common matrix-level row;

wherein said first expandable tree of nodes displays hierarchical data for the first instance of the first dimension in said additional cell-level rows, wherein said second expandable tree of nodes also displays hierarchical data for the second instance of the first dimension in said additional cell-level rows.

9. The method of claim 8, wherein said first expandable tree of nodes includes a top level node and one or more child nodes of said top level node, and wherein only said top level node of said first expandable tree of nodes is rendered on said display.

10. The method of claim 8, wherein said first expandable tree of nodes includes at least a top level node and one or more child nodes of said top level node, and wherein only said top level node of said first expandable tree of nodes is initially rendered on said display, and wherein the method further comprises:

in response to receiving user input, causing said one or more child nodes of said top level node to be rendered on said display in a manner that graphically depicts each of said one or more child nodes to be child nodes of said top level node.

11. The method of claim 8, wherein said first expandable tree of nodes includes at least a top level node and one or more child nodes of said top level node, and wherein only said top level node of said first expandable tree of nodes is initially rendered on said display, and wherein the method further comprises, in response to receiving user input that selects said top level node:

retrieving child data corresponding to said one or more child nodes of said top level node, wherein said retrieving said child data is not performed until said user input is received, and updating said display to render said one or more child nodes on said display using said child data.

12. The method of claim 8, wherein said data rendered on said display includes both hierarchical data and relational data, wherein said hierarchical data is rendered in said first expandable tree of nodes and said second expandable tree of nodes, and wherein said relational data is rendered in said matrix table.

13. The method of claim 8, wherein one or more cells of said matrix table do not contain a tree of nodes.

14. One or more non-transitory computer readable media comprising a plurality of instructions that when executed by one or more processors coupled to a display cause:

rendering a matrix table on said display, wherein said matrix table comprises a plurality of matrix-level columns and a plurality of matrix-level rows;

wherein a first matrix-level column in said plurality of matrix-level columns contains data pertaining to a first instance of a first dimension, said first matrix-level column being identified on said display by a first matrix-level column name;

wherein a second matrix-level column in said plurality of matrix-level columns contains data pertaining to a second instance of said first dimension, said second matrix-level column being identified on said display by a second matrix-level column name;

wherein a first matrix-level row in said plurality of matrix-level rows contains data pertaining to a first instance of a second dimension, said first matrix-level row being identified on said display by a first matrix-level row name;

wherein a second matrix-level row in said plurality of matrix-level rows contains data pertaining to a second instance of said second dimension, said second matrix-level row being identified on said display by a second matrix-level row name;

wherein the first dimension is displayed perpendicular to said second dimension;

wherein said matrix table comprises a plurality of matrix-level cells formed by intersection of each matrix-level column in said plurality of matrix-level columns, with each matrix-level row in said plurality of matrix-level rows; and wherein a first matrix-level cell and a second matrix-level cell in said plurality of matrix-level cells are both displayed in a common matrix-level row in said plurality of matrix-level rows;

rendering, within at least said first matrix-level cell of said matrix table, a first tree table that comprises a first expandable tree of nodes, by including in a first cell-level row within a common matrix-level row in the plurality of matrix-level rows, a first top level node and a first control which allows expanded display of child nodes of the first top level node in additional cell-level rows in said common matrix-level row;

wherein a plurality of first cell-level columns in the first matrix-level cell are identified in said display by a plurality of column names, and a plurality of second cell-level columns in the second matrix-level cell are identified in said display by another plurality column names identical to said plurality of column names;

rendering, within at least said second matrix-level cell of said matrix table, a second tree table that comprises a second expandable tree of nodes, by including in said first cell-level row within said common matrix-level row in the plurality of matrix-level rows, a second top level node and a second control which allows expanded display of at least one child node of the second top level node in at least one of said additional cell-level rows in the common matrix-level row.

15. The one or more non-transitory computer readable media of claim 14, wherein said node is a top level node and said first tree comprises one or more child nodes of said top level node, and wherein only said top level node of said first tree of nodes is rendered on said display by execution of said plurality of instructions.

16. The one or more non-transitory computer readable media of claim 14, wherein said data rendered on said display includes both hierarchical data and relational data, wherein said hierarchical data is rendered in said first tree of nodes, and wherein said relational data is rendered in said matrix table and the method further comprises rendering within at least said second matrix-level cell of said matrix table, a second tree table.

17. One or more non-transitory computer readable media comprising a plurality of instructions that when executed by one or more processors coupled to a display cause:

rendering a matrix table on said display, wherein said matrix table comprises a plurality of matrix-level columns and a plurality of matrix-level rows;

wherein a first matrix-level column in said plurality of matrix-level columns contains data pertaining to a first instance of a first dimension, said first matrix-level column being identified on said display by a first matrix-level column name;

wherein a second matrix-level column in said plurality of matrix-level columns contains data pertaining to a second instance of said first dimension, said second matrix-level column being identified on said display by a second matrix-level column name;

wherein a first matrix-level row in said plurality of matrix-level rows contains data pertaining to a first instance of a second dimension, said first matrix-level row being identified on said display by a first matrix-level row name;

wherein a second matrix-level row in said plurality of matrix-level rows contains data pertaining to a second instance of said second dimension, said second matrix-level row being identified on said display by a second matrix-level row name;

wherein the first dimension is displayed perpendicular to said second dimension;

wherein said matrix table comprises a plurality of matrix-level cells formed by intersection of each matrix-level column of said matrix table with each matrix-level row of said matrix table;

wherein a first matrix-level cell and a second matrix-level cell in said plurality of matrix-level cells are both present in a common matrix-level row in said plurality of matrix-level rows;

rendering, within at least the first matrix-level cell of said matrix table, a first expandable tree of nodes, by including in a first cell-level row within a common matrix-level row in the plurality of matrix-level rows, a first top level node and a first control which allows expanded display of child nodes of the first top level node in additional cell-level rows in said common matrix-level row; and rendering, within at least the second matrix-level cell of said matrix table, a second expandable tree of nodes by including in said first cell-level row within said common matrix-level row, a second top level node and a second control which allows expanded display of at least one child node of the second top level node in at least one of said additional cell-level rows in the common matrix-level row;

wherein said first expandable tree of nodes displays hierarchical data for the first instance of the first dimension in a plurality of cell-level rows, wherein said second expandable tree of nodes displays hierarchical data for the second instance of the first dimension in said plurality of cell-level rows.

18. The one or more non-transitory computer readable media of claim 17, wherein said first expandable tree of nodes includes a top level node and one or more child nodes of said top level node, and wherein only said top level node of said first expandable tree of nodes is rendered on said display by execution of said plurality of instructions.

19. The one or more non-transitory computer readable media of claim 17, wherein said data rendered on said display includes both hierarchical data and relational data, wherein said hierarchical data is rendered in said first expandable tree of nodes and said second expandable tree of nodes, and wherein said relational data is rendered in said matrix table.

* * * * *

UNITED STATES PATENT AND TRADEMARK OFFICE
CERTIFICATE OF CORRECTION

PATENT NO. : 8,327,256 B2
APPLICATION NO. : 12/274172
DATED : December 4, 2012
INVENTOR(S) : Choudhury Page 1 of 1

It is certified that error appears in the above-identified patent and that said Letters Patent is hereby corrected as shown below:

In column 15, line 18, delete "900to" and insert -- 900 to --, therefor.

In column 22, line 32, in Claim 4, delete "wherein" and insert -- wherein said --, therefor.

In column 24, line 63, in Claim 14, delete "plurality" and insert -- plurality of --, therefor.

Signed and Sealed this
Twelfth Day of March, 2013

Teresa Stanek Rea
*Acting Director of the United States Patent and Trademark Office*